(12) United States Patent
Lynas et al.

(10) Patent No.: US 8,393,492 B2
(45) Date of Patent: Mar. 12, 2013

(54) VENT PIPE FOR AN AIRCRAFT FUEL SYSTEM VENT TANK

(75) Inventors: Christopher Lynas, Bristol (GB); Peter William James, Bristol (GB); Robert A. Melville, Bristol (GB)

(73) Assignee: Airbus Operations Limited, Bristol (GB)

( * ) Notice: Subject to any disclaimer, the term of this patent is extended or adjusted under 35 U.S.C. 154(b) by 204 days.

(21) Appl. No.: 12/871,261

(22) Filed: Aug. 30, 2010

(65) Prior Publication Data

US 2011/0056973 A1 Mar. 10, 2011

(30) Foreign Application Priority Data

Sep. 4, 2009 (GB) .................................. 0915358.6

(51) Int. Cl.
*B60P 3/00* (2006.01)
*B62D 33/00* (2006.01)
*B62D 88/12* (2006.01)
(52) U.S. Cl. ....................................................... 220/562
(58) Field of Classification Search .............. 244/135 C, 244/135 R; 220/88.2, 745, 746, 88.1, 562, 220/89.1, 4.01
See application file for complete search history.

(56) References Cited

U.S. PATENT DOCUMENTS

| | | | | |
|---|---|---|---|---|
| 4,194,570 A | * | 3/1980 | Arencibia, Jr. .................. | 169/46 |
| 4,825,653 A | * | 5/1989 | Silvestri, Jr. .................... | 60/646 |
| 6,216,791 B1 | * | 4/2001 | Alhamad ......................... | 169/45 |
| 6,830,219 B1 | * | 12/2004 | Picot et al. ................. | 244/135 R |
| 7,931,720 B2 | * | 4/2011 | Stucki ............................. | 55/396 |
| 2006/0048490 A1 | * | 3/2006 | Carter ............................. | 55/420 |
| 2007/0130962 A1 | * | 6/2007 | Blalock ......................... | 62/47.1 |
| 2008/0295905 A1 | | 12/2008 | Sandiford et al. | |
| 2009/0235622 A1 | * | 9/2009 | Stucki ............................ | 55/418 |

FOREIGN PATENT DOCUMENTS

EP 1591359 A1 11/2005
JP 2003226295 A 8/2003

OTHER PUBLICATIONS

UK Search Report for GB0915358.6 issued Dec. 31, 2009.

* cited by examiner

*Primary Examiner* — Tien Dinh
*Assistant Examiner* — Valentina Xavier
(74) *Attorney, Agent, or Firm* — Lowe Hauptman Ham & Berner LLP

(57) ABSTRACT

A vent pipe is disclosed for use in the vent tank of an aircraft fuel system. The vent pipe is arranged with guide vanes or corner cascades for assisting the flow of fluid around the corners.

9 Claims, 3 Drawing Sheets

VENT PIPE FOR AN AIRCRAFT FUEL SYSTEM VENT TANK

RELATED APPLICATIONS

The present application is based on, and claims priority from, Great Britain Application Number 0915358.6, filed Sep. 4, 2009, the disclosure of which is hereby incorporated by reference herein in its entirety.

FIELD OF INVENTION

The present invention relates to a vent pipe for an aircraft fuel system vent tank.

BACKGROUND OF THE INVENTION

Fuel tank systems for aircraft commonly comprise one or more fuel tanks and a vent tank. The vent tank may also be referred to as a surge tank. The vent tank is arranged to provide venting means to vent the fuel tanks to atmosphere. Vent tanks are arranged to allow air to flow from atmosphere into the fuel tanks as they are drained and to allow air, fuel vapour or inerting gasses or a mixture of these to flow out of the tanks to atmosphere as the tanks are filled. In addition, during such fill or drain operations, vent tanks are also commonly required to equalize pressures in normal operation due to ambient pressure changes.

Vent tanks are commonly arranged with a predetermined liquid fuel storage capacity. This capacity provides storage for liquid fuel forced from the fuel tanks and vent system into the vent tank, for example, as a result of an aircraft manoeuvre or overfilling of the fuel tanks during refuelling of the aircraft. While vent tanks are commonly arranged with means for returning such surges of fuel to the fuel tanks in a controlled manner, if the liquid fuel capacity of the vent tank is exceeded the fuel is vented to atmosphere.

One problem with such surges of liquid fuel is that they may be at a relatively high pressure during filling. If such pressure is not properly vented then the fuel tank system may be physically damaged. This is a particular problem if the fuel tank system comprises an integral part of the aircraft structure. The problem may be exacerbated when fuel is cold and thus more viscous and therefore more resistant to flow through the venting system.

Another problem exists in that fuel storage space in an aircraft is limited and valuable. Vent tanks may be located in areas that are not suitable for fuel storage and generally need to be as space efficient as possible while providing the required vent capacity. For example, vent tanks are commonly located in the wing tips of an aircraft where space, particularly depth, is restricted.

SUMMARY OF THE INVENTION

An embodiment of the invention provides a vent pipe for an aircraft fuel system vent tank, the vent pipe comprising:
an inlet arranged to provide fluid communication between the ullage of a vent tank and the interior of the vent pipe;
an outlet arranged to provide fluid communication between the interior of the vent pipe and an ullage vent for venting the ullage to atmosphere;
a flame barrier means interposed between the inlet and outlet and arranged to prevent a flame front being transmitted via the vent pipe;
one or more corners sections arranged to route the vent pipe between the ullage and the ullage vent; and
one or more guide vanes having a generally curved cross-section located across the interior of the vent pipe within one or more of the corner sections, the longitudinal axis of each vane being arranged substantially perpendicular to the central axis of the vent pipe, the vanes being arranged to guide fluid flow around the respective corner section.

A plurality of the guide vanes may be provided arranged across the width of each corner section. The longitudinal axis of each vane may be arranged perpendicular to both the bisector of the angle of the respective corner section and the central axis of the vent pipe. The perpendicular bisector of the chord between edges of each guide vane may be coincident with the bisector of the angle of the respective corner section. Each guide vane may have a lune cross-section. The vent pipe may comprise at least one substantially 90° corner piece The vent pipe may generally comprise a circular cross-section. The vent pipe may generally comprise a quadrilateral cross-section. The vent pipe may generally comprise an octagonal cross-section.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
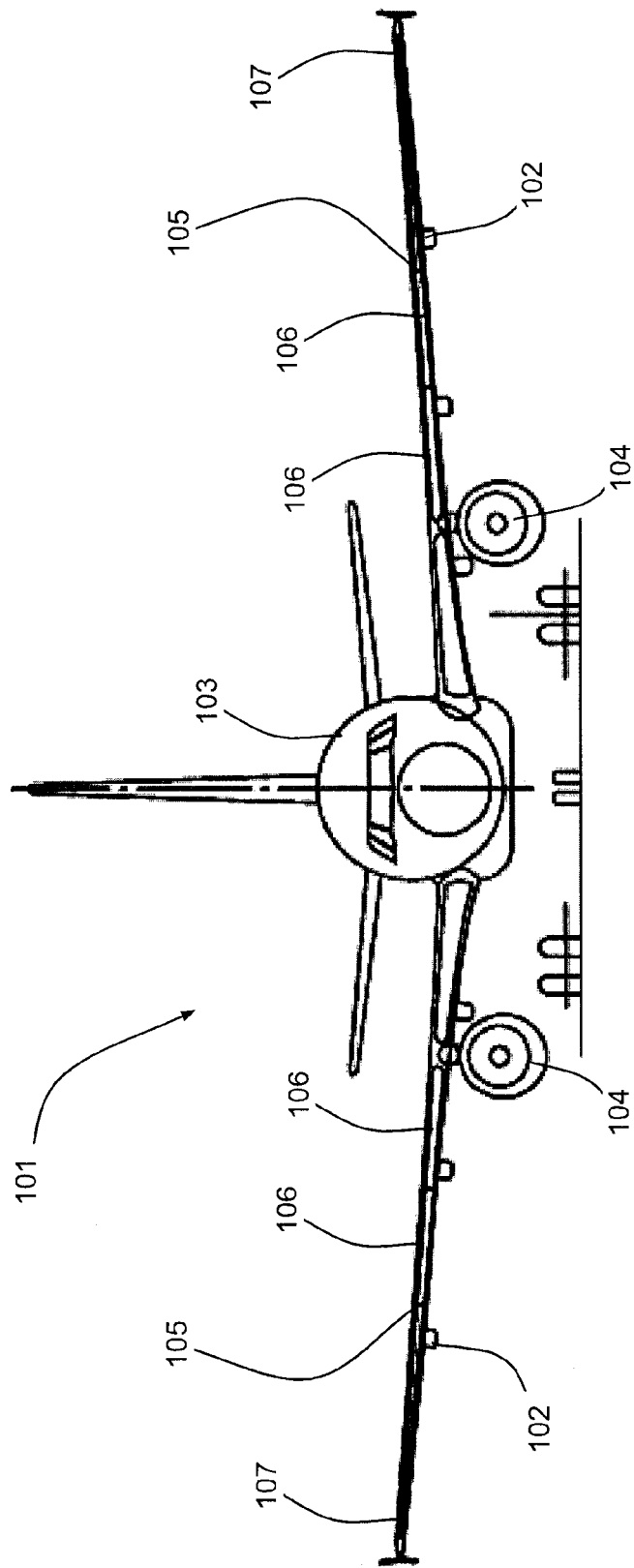
FIG. 1 is a schematic front view of an aircraft.

With reference to FIG. 1, an aircraft 101 comprises a pair of wings 102 faired into a fuselage 103. Each wing 102 carries an engine 104 and part of an internally located fuel tank system 105. The fuel tank system 105 provides fuel to the engines 104. The fuel tank system 105 comprises a set of fuel tanks 106 and two vent tanks 107 each built-in to a respective one of the wings 102. The vent tanks 107 are each located towards the tip of their respective wings 102.

The vent tanks 107 are arranged to perform a number of functions. Firstly, the vent tanks 107 vent the ullage of each of the fuel tanks 106 to atmosphere to enable the ingress of air required to equalise negative pressure in the fuel tanks as a result of for example, fuel being burned by the engines 104, fuel jettison, de-fuel or a decrease in altitude of the aircraft 101. Secondly, the vent tanks 107 vent the ullage of each of the fuel tanks 106 to atmosphere to enable the egress of positive pressure of air, fuel vapour, inerting gasses or a mixture of these from the tanks as a result, for example, of an increase in ambient temperature or altitude of the aircraft 101. Thirdly, the vent tanks 107 are arranged to vent excess liquid fuel from the fuel tanks 106 to atmosphere as a result of, for example, exceptional manoeuvres of the aircraft 101 or by overfilling of the fuel tanks 106 during a refuelling process.

Figure 2:
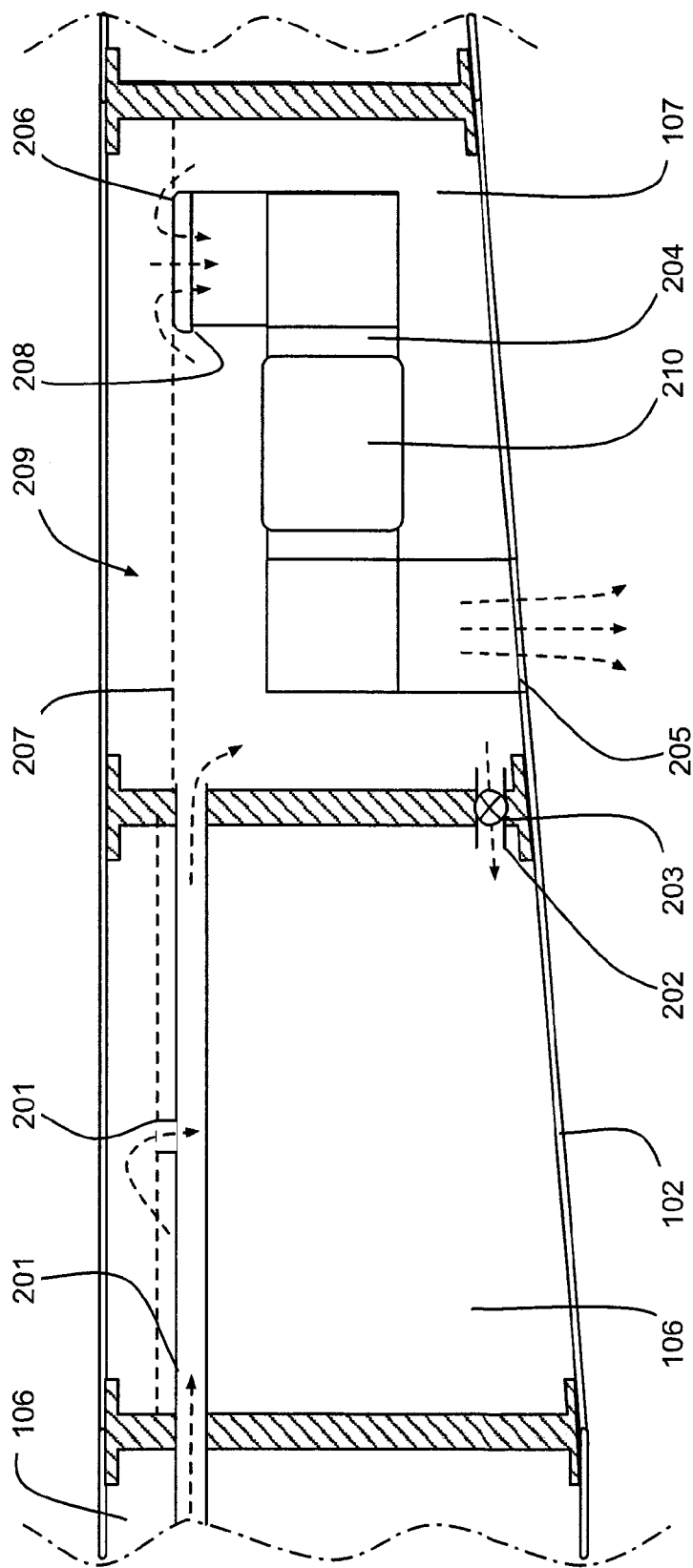
FIG. 2 is a cross-sectional front view of a vent tank in the fuel tank system of the aircraft of FIG. 1.

With reference to FIG. 2, in the present embodiment two fuel tanks 106 and the vent tank 107 are provided by the internal structure of each of the wings 102. The fuel tanks 106 are arranged with a ventilation system comprising a first set of conduits 201 for venting the ullage of each respective fuel tank 106 into the vent tank 107. The fuel and vent tanks 106, 107 are further provided with a fuel return system comprising a second set of conduits 202 controlled by pumps 203 having non-return valves that enable the controlled return of fuel from the vent tank 107 to the fuel tanks 106.

The vent tank 107 further comprises a vent pipe 204 arranged to provide fluid communication between the interior of the vent tank 107 and atmosphere via an ullage vent 205 positioned in the lower wall of the vent tank 107 and the aircraft wing 102. In the present embodiment, the vent pipe 204 has a square cross-section and turns through two substantially right-angled bends within the vent tank 107. The vent pipe 204 has its lower open end in direct fluid communication with the ullage vent 205 and its upper open end 206 positioned level with the maximum designed liquid fuel level 207 of the vent tank 107. In the present embodiment, the upper end of the vent pipe 204 is to provided with a lip 208 arranged to improve the flow of liquid around the upper end of the vent pipe 204 relative to a plain-ended pipe. The space in the vent tank 107 above the maximum designed fuel level 207 is the minimal ullage 209 in normal conditions, that is, the non-overflow condition. Thus, in use, when liquid fuel from the fuel tanks 106 fills the vent tank 107 past its maximum designed liquid fuel level 207, the liquid fuel overflows the lip 208 and flows down the vent pipe 204 into the atmosphere via the ullage vent 205.

The vent pipe 204 further comprises flame barrier means 210 that extends across the diameter of the vent pipe 204. The flame barrier means 210 is arranged so as to not substantially restrict the fluid flow path for liquid fuel from the vent tank 107 out of the ullage vent 205. The flame barrier means 210 is arranged to resist the ingress into the vent tank 107 of a substantially ambient pressure flame front exterior to the wing 102. Such a flame front may wash over the ullage vent 205 in the event of a ground fire during refuelling or other operation of the aircraft 101. In the present embodiment, the flame barrier elements are formed from a conventional flame barrier material such as layered wire mesh. As will be understood by those in the art, the flame barrier may be formed from any suitable material such as non-woven meshes or may comprise one or more granular or particulate layers.

Figure 3:
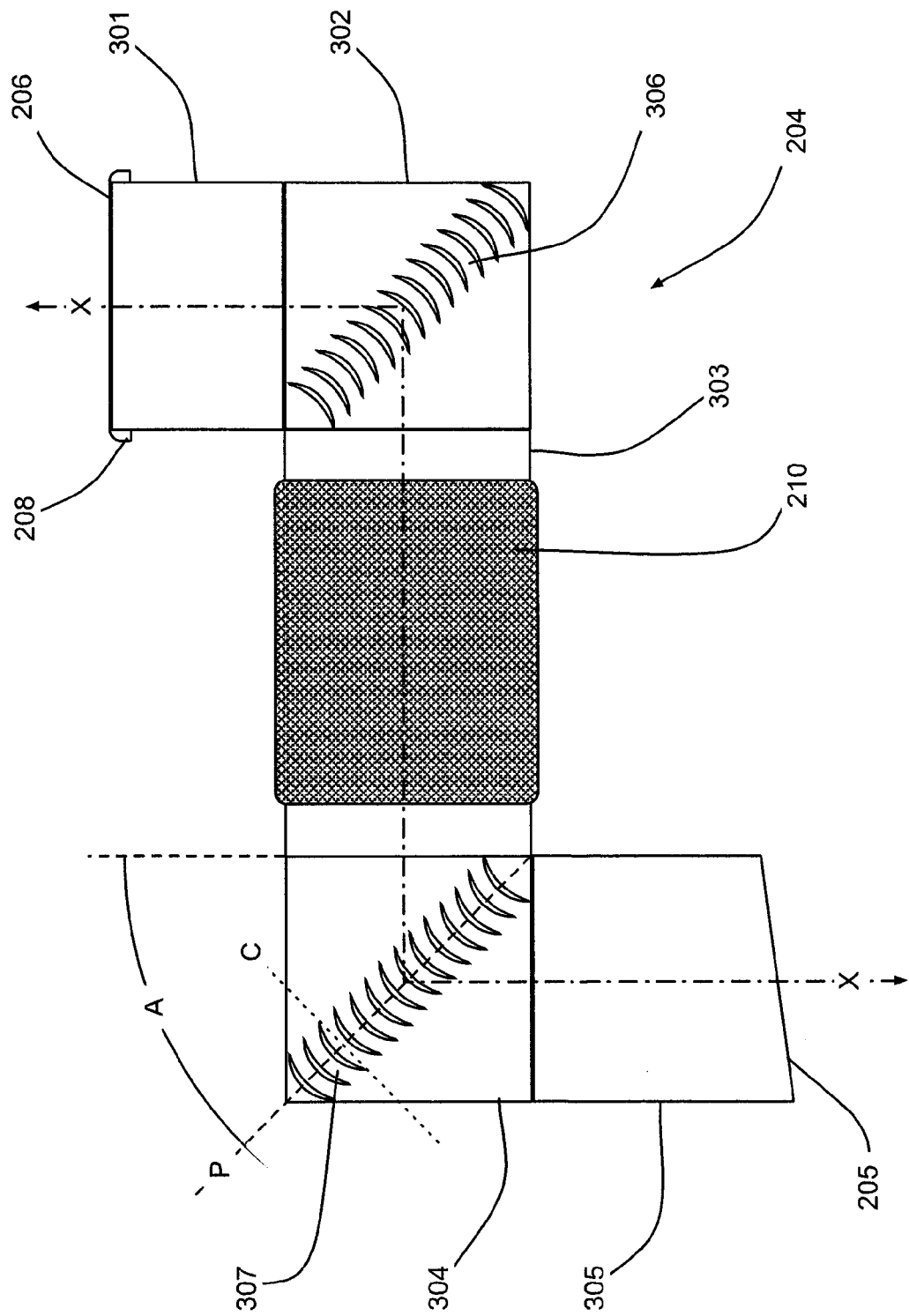
FIG. 3 is a schematic cross-sectional view of a vent pipe in the vent tank of FIG. 2.

With reference to FIG. 3, in the present embodiment, the vent pipe 204 comprises an upper vent section 301, a first corner section 302, a central portion 303, a second corner section 304 and a lower vent section 305. The vent pipe 204 has a central axis X, which is generally coincident with the direction of fluid flow along the vent pipe 204. The upper vent section 301 provides a substantially vertical conduit for venting the ullage 209 and comprises the upper open end 206 of the vent pipe and the lip 208. The upper vent section 301 is connected into the first corner section 302, which provides a substantially 90° lateral bend in the vent pipe 204 and is connected into the central portion 303. The central portion 303 runs substantially horizontally and carries the flame barrier means 210 and is connected into the second corner section 304. The second corner section 304 provides a downward substantially 90° bend in the vent pipe 204 and is connected into the lower vent section 305. The lower vent section 305 provides a second substantially vertical section of the vent pipe 204 and connects to the ullage vent 205.

Each of the corner sections 302, 304 comprises a set of guide vanes 307, each vane comprising a curved cross-section longitudinal member supported at each end by the wall of the respective corner piece 302, 304. In the present embodiment, the cross-section of each guide vane 307 is substantially lune shaped, that is, a concave area bounded by two arcs. The guide vanes in each set of guide vanes 307 are arranged with their longitudinal axes in a single plane P. The longitudinal axes of the guide vanes 307 are arranged perpendicular to the central axis X of the vent pipe 204. In addition, the guide vanes 307 are orientated about their longitudinal axis such that the perpendicular bisector of the chord C between the edges of each vane is coincident with the plane P and bisects the angle A of the respective corner section 302, 304. Thus, in the example of FIG. 3, the plane P is arranged at an angle of 45° to the central axis X of the vent pipe 204. The guide vanes 307 are arranged to assist fluid flow, such as liquid fuel, around each corner piece 302, 304 so that the flow of fluid through the vent pipe 204 is more efficient than that of a vent pipe of the same dimensions without such guide vanes.

In the present embodiment, the flame barrier means 210 is formed from a conventional flame barrier material such as layered wire mesh. As will be understood by those in the art, the flame barrier may be formed from any suitable material such as non-woven meshes or may comprise one or more granular or particulate layers.

As will be understood by those skilled in the art, there may be significant changes in the orientation of the wing 102 depending on whether the aircraft 101 is on level or non-level ground or the aircraft 101 is in flight. Furthermore, whether or not the fuel tank system is full or empty will further influence the orientation of the wing 102. Therefore, references to particular being elements in the above embodiments being in a particular orientation such as horizontal or vertical are intended to be construed accordingly.

Embodiments of the invention provide a vent pipe having guide vanes in one or more of its corner pieces that allow fluid to flow through the angle of the corner piece with higher efficiency than a vent pipe without such guide vanes. Conversely, the increase in efficiency may provide a vent pipe that occupies a lower volume than a vent pipe without such guide vanes but providing an equivalent or improved fluid flow rate.

As will be understood by those skilled in the art, vent pipes may need to be designed to fit around one or more obstacles within the vent tank or wing structure so as to provide a suitable connection between the vent tank ullage and an ullage vent. Thus vent pipes may be engineered with one or more corner pieces with any suitable angle and in any suitable orientation. Such vent pipes may be formed in two or more sections or may be integrally formed.

As will be understood by those skilled in the art, the number and spacing of guide vanes may be varied depending on a particular application.

In another embodiment, the guide vanes have a cross-section comprising purely or a combination of hyperbolic, parabolic or catenary shaped sides. In a further embodiment, the guide vanes are formed from flat plates bent into a curve. In another embodiment the guide vanes have an aerofoil cross-section. The leading edge of the aerofoil cross-section may be oriented towards the flow from the vent tank since it is the egress of liquid fuel, which is preferably most efficient. As will be understood by those in the art, guide vanes may be provided with any suitable cross-section applicable to a given application. Applications may vary in terms of the fluids vented by the vent pipe and the shape and configuration of the vent pipe.

In a further embodiment, the vent pipe has a circular, octagonal or other polyhedral cross-section.

As will be understood by those skilled in the art, the guide vanes may be curved or otherwise shaped along their central axis so as to conform further to the relevant cross section of the vent pipe.

As will be understood by those skilled in the art, the ullage vent may be provided with an ice screen.

A set of one or more guide vanes referred to herein may also be referred to as a corner cascade.

As will be understood by those in the art, the ullage vent may be fed by or feed into an aerodynamic duct, such as a NACA (National Advisory Committee for Aeronautics) duct or the like, for providing an aerodynamic interface between the ullage vent and the external surface of the aircraft.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A vent pipe for an aircraft fuel system vent tank, said vent pipe comprising:
    an inlet arranged to provide fluid communication between the ullage of a vent tank and the interior of said vent pipe;
    an outlet arranged to provide fluid communication between the interior of said vent pipe and an ullage vent for venting said ullage to atmosphere;
    a flame barrier means interposed between said inlet and outlet and arranged to prevent a flame front being transmitted via said vent pipe;
    wherein the vent pipe in its entirety is substantially disposed within the vent tank:
    one or more corner sections are arranged to route said vent pipe between said ullage and said ullage vent; and
    one or more guide vanes having a generally curved cross-section located across the interior of said vent pipe within one or more of said corner sections, the longitudinal axis of each vane being arranged substantially perpendicular to a central axis of said vent pipe, said vanes being arranged to guide fluid flow around the respective corner section.

2. A vent pipe according to claim 1 in which a plurality of said guide vanes are provided arranged across the width of each corner section.

3. A vent pipe according to claim 1 in which said longitudinal axis of each vane is arranged perpendicular to both the bisector of the angle of the respective corner section and the central axis of said vent pipe.

4. A vent pipe according to claim 1 in which the perpendicular bisector of the chord between edges of each guide vane is coincident with the bisector of the angle of the respective corner section.

5. A vent pipe according to claim 1 in which each guide vane has a lune cross-section.

6. A vent pipe according to claim 1 comprising at least one substantially 90° corner piece.

7. A vent pipe according to claim 1 in which said vent pipe generally comprises a circular cross-section.

8. A vent pipe according to claim 1 in which said vent pipe generally comprises a quadrilateral cross-section.

9. A vent pipe according to claim 1 in which said vent pipe generally comprises an octagonal cross-section.

* * * * *